3,096,149
PROCESS FOR THE PRODUCTION OF METAL BORIDES
Bernard A. Gruber, Dayton, Ohio, assignor to Monsanto Chemical Company, St. Louis, Mo., a corporation of Delaware
No Drawing. Filed July 16, 1959, Ser. No. 827,437
6 Claims. (Cl. 23—14)

The present invention relates to a new method for the production of metal borides. It is an object of this invention to provide a new and economical method for the manufacture of metal borides in the form of well crystallized, thermally-stable and chemically-inert materials. It is a further object to provide a method for the production of the said borides from ferroalloys as the source material. Further objects and advantages of the invention will be apparent from the following description.

It has been commonly recognized that refractory metal borides are very difficult to produce by conventional methods such as the reaction of boron with the desired metal.

It has now been found that a particular group of metal borides may be manufactured by conducting the preparation of the desired boride in a molten matrix of a ferroalloy, or combinations thereof.

The relative proportions of the desired metal as a ferroalloy and the proportions of the ferroboron should be in approximately stoichiometric relation. For example, titanium diboride is obtained by the reaction of approximately one mole of titanium with two moles of boron present in the molten matrix.

In the present process the metal which is desired in the final boride is selected from the group consisting of titanium, zirconium, molybdenum, tungsten, chromium, silicon, columbium, vanadium and tantalum. The corresponding source materials are accordingly ferrotitanium, ferrozirconium, ferromolybdenum, ferrotungsten, ferrochromium, ferrosilicon, ferrocolumbium, ferrovanadium and ferrotantalum. However, it is also contemplated that elemental metals can also be supplied for reaction with the boron in the molten matrix. Iron may similarly be supplied to the matrix, particularly for the regulation of the viscosity and other characteristics of the matrix as well as for the provision of a sufficient quantity of the matrix for crystallization of the desired boride. It is thus possible to regulate the size of the metal boride crystals which have been obtained, and also to direct the crystallization step in order to obtain crystals which are desired in specific applications such as in the preparation of a grade of boride suitable for use as refractory hard metals. Ternary boride compositions, including doped products containing minor proportions of group II to group VI metals are also contemplated in the present invention.

The boron moiety of the desired metal boride is preferably introduced into the matrix as ferroboron. However, it is also contemplated that elemental boron can be added to the molten matrix as a boron source. Precursors which yield boron, for example, boric oxide plus carbon may similarly be employed.

As a result of the introduction of the metal components, preferably as ferroalloys, together with the boron source, preferably as ferroboron, the desired metal boride is readily obtained in solution, or dispersion, in the molten metal matrix. After all of the components have been dissolved by heating the mixture above the melting point, the melt can preferably be slow cooled at a rate of 1 to 100° C./min., in which case the resultant particles of the desired boride are obtained as relatively large single crystals. The melt can also be quenched, in which case the boride particles are obtained as micro crystallites, making them very desirable for powder metallurgy applications. The relative proportions between the desired metal, the boron content and the relative proportions of iron in the matrix are not critical and may be varied over a wide range. However, for efficient use of the raw materials, stoichiometric ratios constitute a preferred embodiment. It has been found that upon cooling of the matrix, the desired metal boride is easily precipitated and is grown to the desired crystal size by regulation of the rate of cooling.

After the matrix containing the desired borides has been cooled, the matrix metal is removed such as by first crushing the material to a fine particle size, after which a mineral acid (e.g., hydrochloric or nitric acid) is employed to dissolve away the matrix metal leaving the insoluble borides as a residual crystal product. It is feasible in this way, particularly by the use of slow cooling to obtain a single crystal form of the boride. The term "single crystal" as employed herein refers to a crystalline material in which the particles are composed completely of one crystal only in contrast to polycrystalline particles. The size of these single crystals may range from 0.1 micron to ⅛ inch or larger on at least one axis.

In addition to single borides, combinations for example, titanium zirconium boride may also be produced in accordance with the method described above. For example, ferrotitanium, ferrozirconium and ferroboron are mixed to obtain a molten matrix containing these components. When this is cooled, the resultant product contains titanium zirconium boride. Various other mixed borides such as chromium molybdenum boride may similarly be obtained by the choice of the proper starting materials.

The molten matrix after having been held at a temperature suitable for the maintenance of the liquid state may be cooled very slowly, or may be rapidly quenched, particularly employing quenching when single crystals of small sizes are desired. The reaction time has been found to be a non-critical variable, and the contacting of the components in the molten condition may vary from periods of a few minutes to several hours.

The following examples illustrate specific embodiments of the present invention.

*Example 1*

A charge mixture was prepared using 100 g. of ferrotitanium, containing 30% titanium, and 78 g. of ferroboron containing 17.5% boron, which was placed in an alumina crucible and melted in a furnace maintained at 1,600° C. The molten mixture was then cooled gradually by turning off the power supply to the furnace resulting in the solidification of the mixture after a period of about one hour. The completely cooled mass was then crushed to a particle size of about 20 mesh, after which the reaction mixture was extracted with hydrochloric acid to dissolve the iron and any free elements. The product thus obtained was found to consist of finely divided crystals of titanium diboride as a single crystal.

*Example 2*

A charge mixture was prepared using 100 g. of ferromolybdenum, 100 g. of ferrochromium, and 100 g. ferroboron, which was placed in an alumina crucible and melted in a furnace maintained at 1,700° C. The molten mixture was then quenched to room temperature and the resulting ingot crushed to pass a 20 mesh screen, and then extracted with hydrochloric acid to dissolve iron and impurity metals. The product thus obtained was found to consist of one micron diameter particles whose composition approximated $CrMoB_2$.

What is claimed is:

1. Process for the production of a single crystal form of metal borides selected from the group consisting of the borides of titanium, zirconium, molybdenum, tungsten, chromium, silicon, columbium, vanadium and tantalum, which comprises melting together a preformed ferroalloy of the desired metal in a molten matrix with approximately stoichiometrical amounts of preformed ferroboron relative to the metal in said ferroalloy, cooling the said molten matrix at a rate of from 1° to 100° C./min. to crystallize the desired metal boride, and thereafter isolating the said metal boride having a crystal size ranging from at least 0.1 micron to more than 1/8 inch on at least one axis.

2. Process for the production of a single crystal form of metal borides selected from the group consisting of the borides of titanium, zirconium, molybdenum, tungsten, chromium, silicon, columbium, vanadium and tantalum, which comprises melting together a preformed ferroalloy of the desired metal in a matrix containing approximately stoichiometrical amounts of preformed ferroboron relative to the metal in said ferroalloy, cooling the said matrix at a rate of from 1° to 100° C./min. to crystallize the desired metal boride, and thereafter subjecting the reaction product to a mineral acid to dissolve away the metal and to leave the metal boride as a residual product having a crystal size ranging from at least 0.1 micron to more than 1/8 inch on at least one axis.

3. Process for the production of a single crystal form of titanium diboride which comprises melting together ferrotitanium and ferroboron at a temperature of from 1,400° C. to 2,000° C., in the proportion of approximately one mole of titanium to two moles of boron, and thereafter cooling the molten mixture at a rate of from 1° to 100° C./min. to solidification and isolating the titanium diboride from the reaction mixture.

4. Process for the production of a single crystal form of a ternary metal boride selected from the group consisting of the borides of titanium, zirconium, molybdenum, tungsten, chromium, silicon, columbium, vanadium, and tantalum, which comprises melting together two preformed ferroalloys of the desired metal in a molten matrix with approximately stoichiometric amounts of preformed ferroboron relative to the metal in said ferroalloys, cooling the said molten matrix at a rate of from 1° to 100° C./min. to crystallize the desired ternary metal boride, and thereafter, isolating the said ternary metal boride having a crystal size ranging from at least 0.1 micron to more than 1/8 inch on at least one side.

5. Process for the production of a single crystal form of the ternary metal boride $CrMoB_2$ which comprises melting together preformed ferromolybdenum, ferrochromium, and ferroboron, in the proportion of approximately one mole of molybdenum, one mole of chromium, and two moles of boron, and thereafter cooling the molten mixture at a rate of from 1° to 100° C./min. to crystallize the ternary metal boride and isolating the $CrMoB_2$ from the reaction mixture.

6. Process according to claim 5 wherein the $CrMoB_2$ is isolated by subjecting the reaction mixture to a mineral acid to dissolve away the metal and leave the ternary metal boride as a residual product.

References Cited in the file of this patent

FOREIGN PATENTS 457,760   Great Britain _____ Nov. 29, 1936

OTHER REFERENCES

Ephraim, "Inorganic Chemistry," 1943, 4th English edition, pages 848–851 and 855.